United States Patent
Hirose et al.

(10) Patent No.: US 11,954,107 B2
(45) Date of Patent: Apr. 9, 2024

(54) INFORMATION PROCESSING APPARATUS, METHOD AND STORAGE MEDIUM

(71) Applicant: KABUSHIKI KAISHA TOSHIBA, Tokyo (JP)

(72) Inventors: Shigeo Hirose, Kawasaki (JP); Mototaka Kanematsu, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/893,470

(22) Filed: Aug. 23, 2022

(65) Prior Publication Data

US 2023/0185808 A1 Jun. 15, 2023

(30) Foreign Application Priority Data

Dec. 10, 2021 (JP) .................................. 2021-200960

(51) Int. Cl.
*G06F 16/2455* (2019.01)
*G06F 16/2453* (2019.01)

(52) U.S. Cl.
CPC .... *G06F 16/2456* (2019.01); *G06F 16/24537* (2019.01)

(58) Field of Classification Search
CPC .......... G06F 16/2456; G06F 16/24537; G06F 16/2471; G06F 16/24544
See application file for complete search history.

(56) References Cited

U.S. PATENT DOCUMENTS

| 2003/0195881 A1* | 10/2003 | Koo | G06F 16/24537 |
| | | | 707/999.005 |
| 2005/0278114 A1* | 12/2005 | Ahmad | G06F 16/284 |
| | | | 701/431 |
| 2021/0232560 A1* | 7/2021 | Mateti | G06F 16/25 |

FOREIGN PATENT DOCUMENTS

| JP | 2012536260 A * | 7/2011 |
| JP | 2011159038 A * | 8/2011 |
| JP | 6371136 B2 * | 8/2018 |
| JP | 6371136 B2 | 8/2018 |

* cited by examiner

*Primary Examiner* — Mark D Featherstone
*Assistant Examiner* — Kweku William Halm
(74) *Attorney, Agent, or Firm* — Oblon, McClelland, Maier & Neustadt, L.L.P.

(57) ABSTRACT

According to one embodiment, an information processing apparatus includes a processor. The processor is configured to receive, from a client terminal, a first query to request a result of a join operation process on first and second tables, create a second query to a first database management device based on the first query, receive the first table from the first database management device by performing a process on the second query, create a third query to a second database management device based on the first query and the first table, receive a part of a second table from the second database management device by performing a process on the third query, and transmit, to the client terminal, a response to the first query based on the part of the second table.

2 Claims, 7 Drawing Sheets

| Node ID | Table name | Number of records | |
|---|---|---|---|
| 001 | T1 | 2,000,000 | ~301a |
| 002 | T2 | 10,000,000 | ~301b |

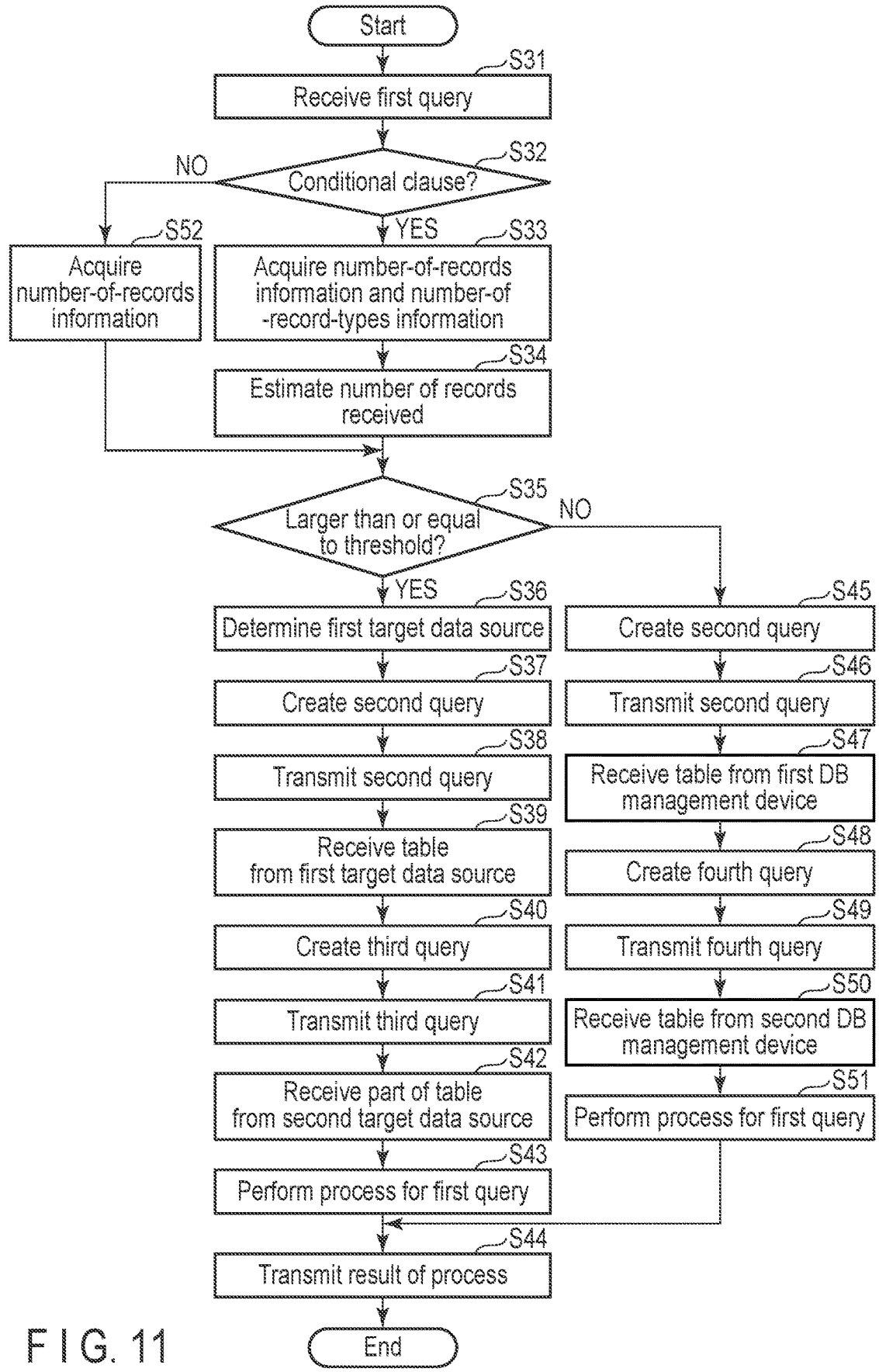
F I G. 11

INFORMATION PROCESSING APPARATUS, METHOD AND STORAGE MEDIUM

CROSS-REFERENCE TO RELATED APPLICATIONS

This application is based upon and claims the benefit of priority from Japanese Patent Application No. 2021-200960, filed Dec. 10, 2021, the entire contents of which are incorporated herein by reference.

FIELD

Embodiments described herein relate generally to an information processing apparatus, a method and a storage medium.

BACKGROUND

In recent years, there has been known an information processing apparatus capable of performing a join operation process on data (tables) acquired from a plurality of individual databases and providing a result of the join operation process (a join operation result) to (a user who uses) a client terminal.

However, the amount of processing (the amount of calculation) associated with the join operation process is large, and it is required to reduce the load of the information processing apparatus.

BRIEF DESCRIPTION OF THE DRAWINGS

FIG. 11 is a flowchart illustrating an example of a processing procedure of the information processing apparatus.

DETAILED DESCRIPTION

In general, according to one embodiment, an information processing apparatus communicably connected to a client terminal used by a user, a first database management device that manages a first database that stores a first table, and a second database management device that manages a second database that stores a second table is provided. The information processing apparatus includes a processor. The processor is configured to receive, from the client terminal, a first query to request a result of a join operation process on the first and second tables, create a second query to the first database management device based on the first query received, receive a first table stored in the first database from the first database management device by performing, in the first database management device, a process on the second query created, create a third query to the second database management device based on the first query received and the first table received, receive a part of a second table stored in the second database from the second database management device by performing, in the second database management device, a process on the third query created, and transmit, to the client terminal, a response to the first query based on the part of the second table received.

Various embodiments will be described with reference to the accompanying drawings.

First Embodiment

Figure 1:
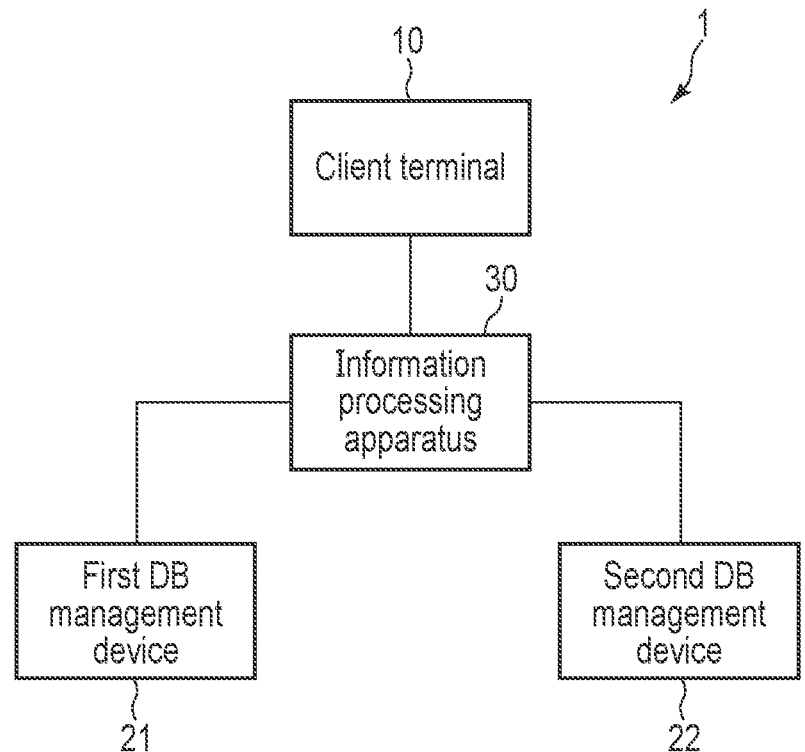
FIG. 1 is a diagram illustrating an example of a network configuration of an information processing system according to a first embodiment.

FIG. 1 illustrates an example of a network configuration of an information processing system according to the present embodiment. As illustrated in FIG. 1, an information processing system 1 includes a client terminal 10, first and second database management devices (hereinafter, referred to as "DB management devices") 21 and 22, and an information processing apparatus 30.

In the present embodiment, the client terminal 10 is communicably connected to the information processing apparatus 30. In addition, each of the first and second DB management devices 21 and 22 is communicably connected to the information processing apparatus 30.

The client terminal 10 is a terminal device used by a user. In the client terminal 10, an application program (a client application program) or the like for the user to acquire and browse data stored in a database to be described later is operated.

Each of the first and second DB management devices 21 and 22 is a server apparatus (DBMS) that manages a database, and operates as a child node of the information processing apparatus 30. Tables holding various data are stored in the databases managed by the first and second DB management devices 21 and 22.

The information processing apparatus 30 is a server apparatus that operates as a parent node of the first and second DB management devices 21 and 22. For example, in response to a request (a query) from the client terminal 10, the information processing apparatus 30 receives tables (hereinafter, simply referred to as "tables of the first and second DB management devices 21 and 22") stored in the databases managed by the first and second DB management devices 21 and 22 from the first and second DB management devices 21 and 22, and performs a join operation process (a process of joining two tables) or the like on the received tables. The result of the join operation process performed by the information processing apparatus 30 is returned to the client terminal 10 as a response to the request from the client terminal 10.

As described above, the information processing system 1 according to the present embodiment operates in such a manner that (the data held in) the tables distributed in the first and second DB management devices 21 and 22 are joined (integrated) in the information processing apparatus 30 and the joined table is provided to (the user who uses) the client terminal 10.

Note that although the information processing system 1 includes the client terminal 10, the first and second DB management devices 21 and 22, and the information processing apparatus 30 in FIG. 1, the information processing system 1 may be configured to include the first and second DB management devices 21 and 22 and the information processing apparatus 30 (that is, the client terminal 10 may be disposed outside the information processing system 1).

Furthermore, only the first and second DB management devices 21 and 22 are illustrated in FIG. 1, but the information processing system 1 may include three or more DB management devices.

Figure 2:
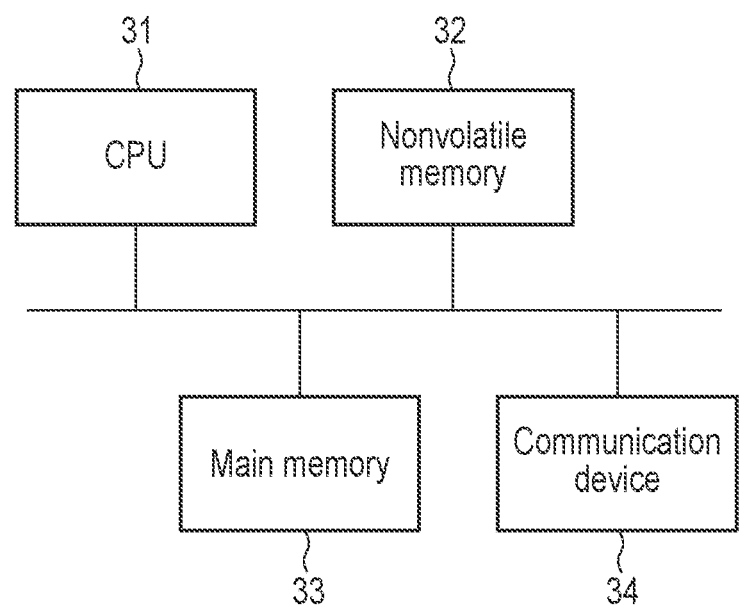
FIG. 2 is a diagram illustrating an example of a hardware configuration of an information processing apparatus.

FIG. 2 is a diagram illustrating an example of a hardware configuration of the information processing apparatus 30 illustrated in FIG. 1. As illustrated in FIG. 2, the information processing apparatus 30 includes a CPU 31, a nonvolatile memory 32, a main memory 33, a communication device 34, and the like.

The CPU 31 is a processor that controls the operation of each component in the information processing apparatus 30. The CPU 31 executes various programs loaded from the nonvolatile memory 32, which is a storage device, to the main memory 33. These programs include an operating system (OS), a program for the information processing apparatus 30 to operate in the information processing system 1, and the like.

The communication device 34 is a device configured to perform wired or wireless communication with the client terminal 10 and the first and second DB management devices 21 and 22.

Although only the CPU 31, the nonvolatile memory 32, the main memory 33, and the communication device 34 are illustrated in FIG. 2, the information processing apparatus 30 may further include other storage devices such as a hard disk drive (HDD) and a solid state drive (SSD), or may further include other devices.

Although the hardware configuration of the information processing apparatus 30 has been described here, for example, the first and second DB management devices 21 and 22 are only required to have a hardware configuration similar to that of the information processing apparatus 30.

Here, the outline of an operation of an information processing apparatus 30' according to a comparative example of the present embodiment will be described with reference to FIG. 3. Note that the information processing apparatus 30' is assumed to be communicably connected to the client terminal 10 and the first and second DB management devices 21 and 22, similarly to the information processing apparatus 30 according to the present embodiment.

Figure 3:
FIG. 3 is a diagram for explaining the outline of an operation of an information processing apparatus according to a comparative example of the present embodiment.

Here, as illustrated in FIG. 3, it is assumed that a table T1 is stored in the database managed by the first DB management device 21. Note that columns id and aaa are set in the table T1, and the table T1 has a plurality of records including individual values of the columns.

In addition, it is assumed that a table T2 is stored in the database managed by the second DB management device 22. Note that columns id and bbb are set in the table T2, and the table T2 has a plurality of records including individual values of the columns.

In this case, in order to browse the tables T1 and T2 (data) of the first and second DB management devices 21 and 22 described above, the user who uses the client terminal 10 can specify a query (a request to the information processing system) by operating the client terminal 10. The query specified by the user is, for example, an instruction statement (a SQL statement) described in a structured query language (SQL).

Here, it is assumed that a query to request (browse) a result of the join operation process on the tables (that is, tables distributed to different data sources) of the first and second DB management devices 21 and 22 is specified by the user, and that the query "SELECT TABLE T2.id FROM TABLE T1 INNER JOIN TABLE T2 ON TABLE T1.id=TABLE T2.id" is specified. Note that, in this query, the table T1 of the first DB management device 21 and the table T2 of the second DB management device 22 are specified, and this query means joining the tables T1 and T2 based on the values of the column id set in the tables T1 and T2, and acquiring a list (hereinafter, referred to as "id list") of the values of the column id set in the joined table.

In a case where such a query is transmitted from the client terminal 10 to the information processing apparatus 30', the information processing apparatus 30' receives (acquires) (all records included in) the table T1 from the first DB management device 21, and receives (acquires) (all records included in) the table T2 from the second DB management device 22.

Next, the information processing apparatus 30' joins the table T1 received from the first DB management device 21 and the table T2 received from the second DB management device 22 based on the query transmitted from the client terminal 10.

In this case, the information processing apparatus 30' refers to the records included in the table T1 received from the first DB management device 21 and the records included in the table T2 received from the second DB management device 22, and joins the records whose column id values match.

According to the example illustrated in FIG. 3, a record in which the value of the column id set in the table T1 is "111" and the value of the column aaa set in the table T1 is "aaa1" and a record in which the value of the column id set in the table T2 is "111" and the value of the column bbb set in the table T2 is "bbb1" have the same value of the column id. In this case, by joining these two records, a record in which the value of the column id is "111", the value of the column aaa is "aaa1", and the value of the column bbb is "bbb1" is obtained. Here, the case of joining the records in which the value of the column id is "111" has been described. However, in a case where there are another values of the column id that match in the tables T1 and T2, records including the value of the column id are similarly joined.

That is, in the process (the join operation process) for the query described above, as described above, a table T12 having records joined based on the matching values of the column id is generated.

Figure 4:
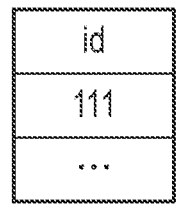
FIG. 4 is a diagram illustrating an example of a response to a query.

Furthermore, since the query transmitted from the client terminal 10 described above requests the id list (the list of the values of the column id set in the table T12 generated by joining the tables T1 and T2), the information processing apparatus 30' acquires (extracts) the values of the column id from the table T12 generated by performing the join operation process, thereby returning, for example, the id list illustrated in FIG. 4 to the client terminal 10 as a response to the query (a result of the join operation process).

As described above, in the comparative example of the present embodiment, in a case where the query to request the result of the join operation process on the table T1 of the first DB management device 21 and the table T2 of the second DB management device 22 is transmitted from the client terminal 10 to the information processing apparatus 30', the join operation process described above is performed, so that the result of the join operation process can be provided to (the user who uses) the client terminal 10.

However, in such a join operation process, push-down from the information processing apparatus 30' to the lower nodes (the first and second DB management devices 21 and 22) cannot be performed. Therefore, the information processing apparatus 30' needs to receive all the records of the tables T1 and T2 of the first and second DB management devices 21 and 22 from the first and second DB management devices 21 and 22.

In this case, the tables T1 and T2 are joined with reference to all the individual records included in the table T1 and all the individual records included in the table T2. Therefore, for example, when the number of records included in the table T1 is N and the number of records included in the table T2 is M, the amount of processing (the amount of calculation) of the join operation process is N×M at the maximum.

That is, in a case where the size of the tables T1 and T2 (the number of records included in the tables) is small, the amount of processing of the join operation process is small. However, for example, in a case where the number of records included in the table T1 is 2,000,000 and the number of records included in the table T2 is 10,000,000, the cost of receiving all the records included in the tables T1 and T2 from the first and second DB management devices 21 and 22 and performing the join operation process is large (that is, the load of the information processing apparatus 30' is large).

Therefore, in the present embodiment, a reduction in the load of the information processing apparatus 30 is achieved in a case where a query to request a result of the join operation process on the tables T1 and T2 of the first and second DB management devices 21 and 22 is received from the client terminal 10.

Hereinafter, the information processing system 1 according to the present embodiment will be described in detail. First, FIG. 5 illustrates an example of a functional configuration of the information processing apparatus 30 included in the information processing system 1.

Figure 5:
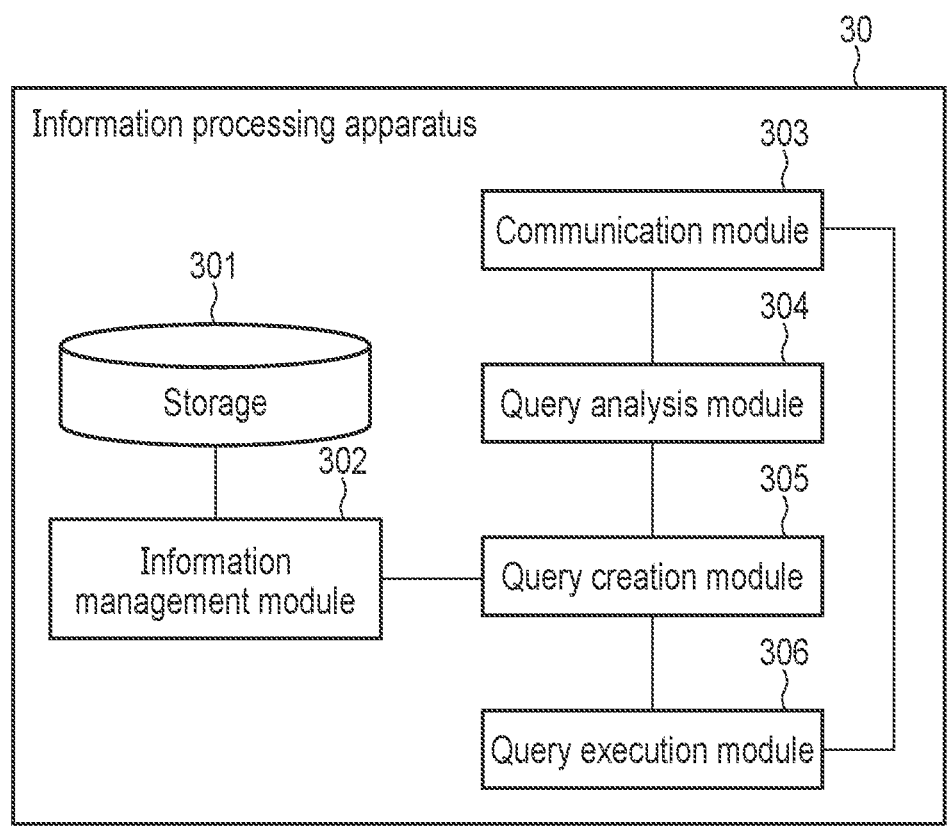
FIG. 5 is a diagram illustrating an example of a functional configuration of the information processing apparatus according to the present embodiment.

As illustrated in FIG. 5, the information processing apparatus 30 includes storage 301, an information management module 302, a communication module 303, a query analysis module 304, a query creation module 305, and a query execution module 306.

Note that, in the present embodiment, the storage 301 is implemented by the nonvolatile memory 32, another storage device, or the like included in the information processing apparatus 30.

Furthermore, in the present embodiment, some or all of the information management module 302, the communication module 303, the query analysis module 304, the query creation module 305, and the query execution module 306 are implemented by causing the CPU 31 (that is, the computer of the information processing apparatus 30) included in the information processing apparatus 30 to execute a predetermined program, that is, by software. This predetermined program is a program for the information processing apparatus 30 to operate in the information processing system 1, and may be stored in advance in a computer-readable storage medium and distributed, or may be downloaded to the information processing apparatus 30 via a network.

Here, it has been described that some or all of the modules 302 to 306 are implemented by software, but some or all of the modules 302 to 306 can be implemented by hardware or can be implemented by a combination of software and hardware, for example.

The storage 301 stores number-of-records information indicating the number of records included in each of the tables of the first and second DB management devices 21 and 22 as information related to each of the first and second DB management devices 21 and 22 communicably connected to the information processing apparatus 30.

The information management module 302 is a functional module that manages the number-of-records information stored in the storage 301. Specifically, the information management module 302 collects (receives) the number-of-records information indicating the number of records included in each of the tables of the first and second DB management devices 21 and 22 from each of the first and second DB management devices 21 and 22, and stores the received number-of-records information in the storage 301.

Since (the number of records included in) each of the tables of the first and second DB management devices 21 and 22 is often updated, the information management module 302 may periodically collect the number-of-records information from the first and second DB management devices 21 and 22 and periodically update the number-of-records information stored in the storage 301.

The communication module 303 is a functional module for performing communication with the client terminal 10. The communication module 303 receives, for example, a query specified by the user in the client terminal 10 from the client terminal 10.

The query analysis module 304 analyzes the query received by the communication module 303, and determines a process to be performed in the first and second DB management devices 21 and 22.

The query creation module 305 creates a query to (the database managed by) the first DB management device 21, for example, based on the result determined by the query analysis module 304.

The query execution module 306 transmits the query to the first DB management device 21 created by the query creation module 305 to the first DB management device 21, and causes the first DB management device 21 to perform the process for the query.

In a case where the query is transmitted to the first DB management device 21 by the query execution module 306, the process for the query is performed in the first DB management device 21. As a result, the query execution module 306 receives (all records included in) the table of the first DB management device 21 from the first DB management device 21.

In this case, the query creation module 305 creates a query to (the database managed in) the second DB management device 22 based on the result (that is, the query received by the communication module 303) determined by the query analysis module 304 and the table of the first DB management device 21 received by the query execution module 306.

The query execution module 306 transmits the query to the second DB management device 22 created by the query creation module 305 to the second DB management device 22, and causes the second DB management device 22 to perform the process for the query.

In a case where the query is transmitted to the second DB management device 22 by the query execution module 306, the process for the query is performed in the second DB management device 22. As a result, the query execution module 306 receives a part of the table of the second DB management device 22 from the second DB management device 22.

The query execution module 306 performs the process for the query (that is, the query specified by the user) received by the communication module 303 on the table of the first DB management device 21 and a part of the table of the second DB management device 22.

The result of the process for the query performed by the query execution module 306 is transmitted to the client terminal 10 via the communication module 303 as a response to the query.

In the present embodiment, the response to the query transmitted from the information processing apparatus 30 to the client terminal 10 is only required to be based on at least a part of the table received from the second DB management device 22 described above, but details will be described later.

Note that, it has been described that the query to the first DB management device 21 is transmitted to the first DB management device 21, and the query to the second DB management device 22 created based on the table received from the first DB management device 21 that has performed the process for the query is transmitted to the second DB management device 22 (that is, the table of the first DB management device 21 is received first). However, in the present embodiment, the table of the second DB management device 22 may be received first. As described above, it is assumed that the DB management device that receives the table first is determined by the query creation module 305 based on the number-of-records information stored in the storage 301 described above.

Next, an example of a functional configuration of the first DB management device 21 communicably connected to the information processing apparatus 30 according to the present embodiment will be described with reference to FIG. 6.

Figures 6, 7:
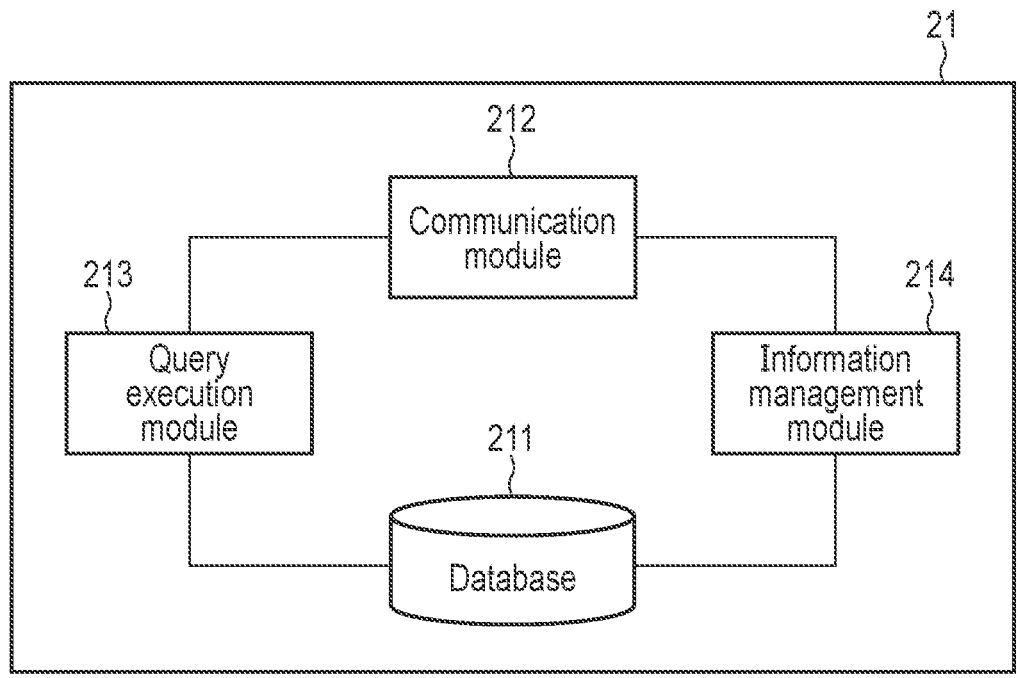
FIG. 6 is a diagram illustrating an example of a functional configuration of a first DB management device.
FIG. 7 is a diagram illustrating an example of a data structure of number-of-records information.

As illustrated in FIG. 6, the first DB management device 21 includes a database 211, a communication module 212, a query execution module 213, and an information management module 214.

In the present embodiment, the database 211 is implemented by a nonvolatile memory, another storage device, or the like included in the first DB management device 21.

Furthermore, in the present embodiment, some or all of the communication module 212, the query execution module 213, and the information management module 214 are implemented by causing a CPU (that is, the computer of the first DB management device 21) included in the first DB management device 21 to execute a predetermined program, that is, by software. This predetermined program is a program for the first DB management device 21 to operate in the information processing system 1, and may be stored in advance in a computer-readable storage medium and distributed, or may be downloaded to the first DB management device 21 via a network.

Here, it has been described that some or all of the modules 212 to 214 are implemented by software, but some or all of the modules 212 to 214 can be implemented by hardware or can be implemented by a combination of software and hardware, for example.

The database 211 stores a table (data in a table format) that is provided to a user by performing a process for a query specified by the user in the client terminal 10 as described above. A plurality of tables may be stored in the database 211. In addition, the database 211 further stores number-of-records information indicating the number of records of the table stored in the database 211. Note that the number-of-records information may be stored in a database different from the database 211.

The communication module 212 is a functional module for performing communication with the information processing apparatus 30. The communication module 212 receives a query (a query to the first DB management device 21) transmitted from the information processing apparatus 30.

The query execution module 213 is a functional module that performs a process for the query received by the communication module 212. In a case where the process for the query is performed by the query execution module 213, the query execution module 213 acquires a table from the database 211. The table acquired by the query execution module 213 in this manner is transmitted from the first DB management device 21 to the information processing apparatus 30 via the communication module 212.

The information management module 214 is a functional module that manages a table stored in the database 211, number-of-records information indicating the number of records of the table, and the like. Specifically, the information management module 214 has a function of updating the table and a function of updating the number-of-records information in accordance with the update of (the number of records) of the table.

In addition, the information management module 214 periodically transmits the number-of-records information stored in the database 211 to the information processing apparatus 30 via the communication module 212. The number-of-records information transmitted from the information management module 214 to the information processing apparatus 30 in this manner is received by the information management module 302 and stored in the storage 301. Note that the number-of-records information may be transmitted to the information processing apparatus 30 when the first DB management device 21 is connected to the information processing apparatus 30, or may be transmitted to the information processing apparatus 30 when the number-of-records information is updated, for example.

Although the functional configuration of the first DB management device 21 has been described with reference to FIG. 6, the functional configuration of the second DB management device 22 is similar to that of the first DB management device 21. Hereinafter, not only the functional configuration of the first DB management device 21 but also the functional configuration of the second DB management device 22 will be described with reference to FIG. 6.

Here, an example of the data structure of the number-of-records information (that is, the number-of-records information managed by the information management module 302) stored in the storage 301 included in the information processing apparatus 30 will be described with reference to FIG. 7.

As illustrated in FIG. 7, the number-of-records information includes a node ID, a table name, and the number of records in association with each other.

The node ID is identification information for identifying a DB management device (that is, a node) communicably connected to the information processing apparatus 30. The table name is a name assigned to the table of the DB management device identified by the node ID associated with the table name. The number of records is the number of records included in the table to which the table name associated with the number of records is assigned.

Here, as illustrated in FIG. 7, it is assumed that the storage 301 stores pieces of number-of-records information 301a and 301b. Note that, it is assumed that the table T1 is stored in the database 211 of the first DB management device 21 and the table T2 is stored in the database 211 of the second DB management device 22.

The number-of-records information 301a includes a node ID "001", a table name "T1", and the number of records "2,000,000". The number-of-records information 301a indicates that the table T1 is stored in the database 211 of the first DB management device 21 (the DB management device identified by the node ID "001"), and the number of records of the table T1 is 2,000,000.

In addition, the number-of-records information 301b includes a node ID "002", a table name "T2", and the number of records "10,000,000". The number-of-records information 301b indicates that the table T2 is stored in the database 211 of the second DB management device 22 (the DB management device identified by the node ID "002"), and the number of records of the table T2 is 10,000,000.

Here, the number-of-records information 301a and 301b has been described, but it is assumed that the number-of-records information is stored in the storage 301 for each table stored in the database 211 of each of the first and second DB management devices 21 and 22.

Next, an example of a processing procedure of the information processing apparatus 30 according to the present embodiment will be described with reference to a flowchart of FIG. 8.

First, when browsing the tables (data) stored in the databases 211 of the first and second DB management devices 21 and 22, a user specifies a query (SQL) for acquiring the data by operating the client terminal 10. As a result, in the client terminal 10 (client application program), the query specified by the user is created.

The query (hereinafter, referred to as "first query") created in the client terminal 10 as described above is transmitted from the client terminal 10 to the information processing apparatus 30 and received by the communication module 303 included in the information processing apparatus 30 (step S1).

It is assumed in the present embodiment that the first query received in step S1 is a query that requests a result of the join operation process on the tables of the first and second DB management devices 21 and 22 such as "SELECT TABLE T2.id FROM TABLE T1 INNER JOIN TABLE T2 ON TABLE T1.id=TABLE T2.id" described above.

Figure 8:
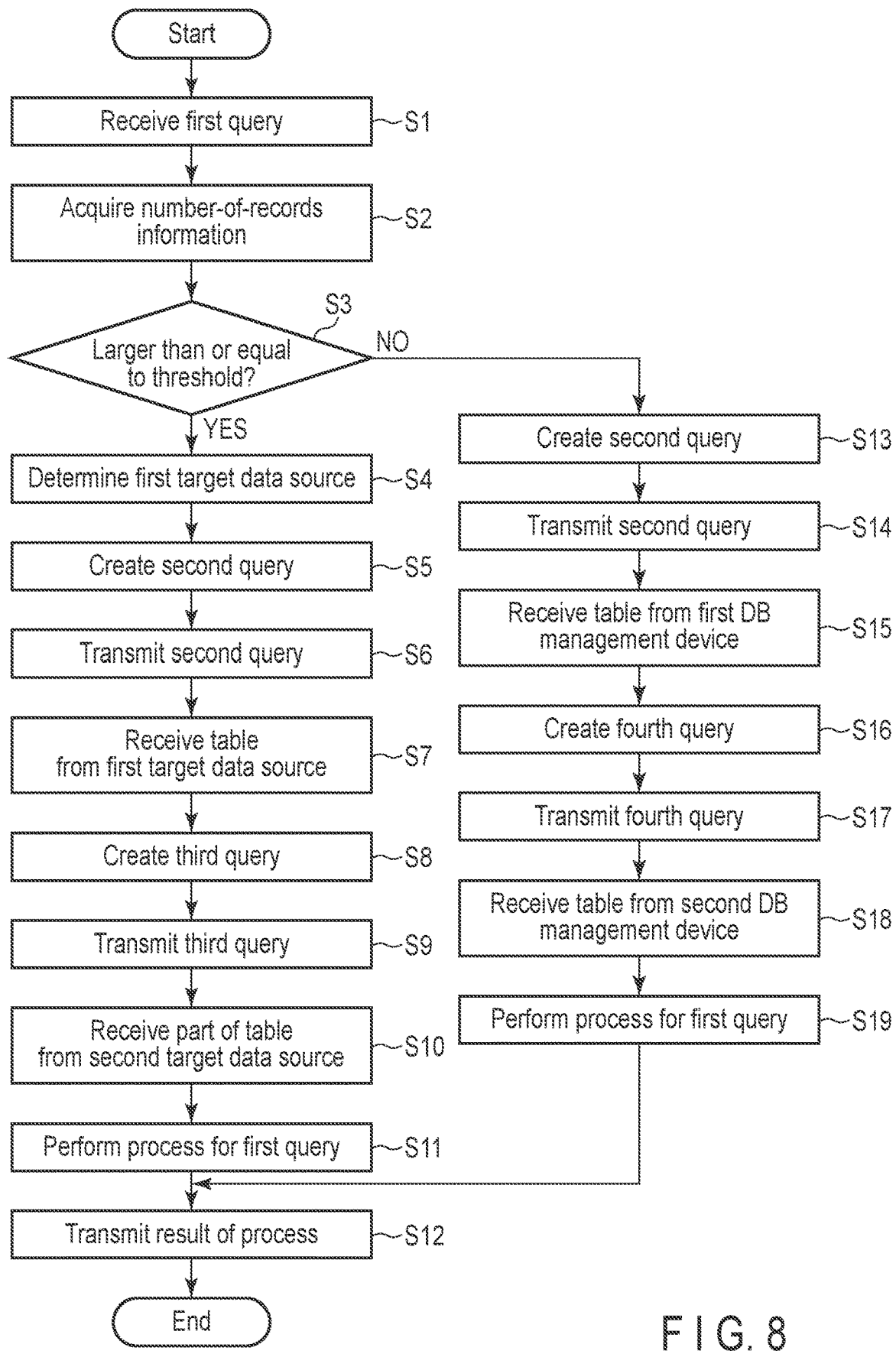
FIG. 8 is a flowchart illustrating an example of a processing procedure of the information processing apparatus.

Although not illustrated in FIG. 8, the first query received in step S1 is analyzed by the query analysis module 304 in order to determine the process to be performed in the first and second DB management devices 21 and 22.

Next, the query creation module 305 acquires number-of-records information stored in the storage 301 via the information management module 302 (step S2).

When the process in step S2 is performed, the query creation module 305 determines whether or not at least one of the number of records (hereinafter, referred to as "the number of records of the first DB management device 21") of the table of the first DB management device 21 and the number of records (hereinafter, referred to as "the number of records of the second DB management device 22") of the table of the second DB management device 22 is larger than or equal to a predetermined value (hereinafter, referred to as "threshold") based on the number-of-records information acquired in step S2 (step S3).

Note that the threshold used in step S3 may be, for example, a value determined based on the number of records (that is, the maximum number of records that can be included in the tables) or the like set in the tables of the first and second DB management devices 21 and 22, may be a value specified by the administrator of the information processing system 1 or the user who uses the client terminal 10, or may be a value determined based on the processing performance or the like of the information processing apparatus 30.

If it is determined that at least one of the number of records of the first DB management device 21 and the number of records of the second DB management device 22 is larger than or equal to the threshold (YES in step S3), the query creation module 305 determines, between the first and second DB management devices 21 and 22, a DB management device (hereinafter, referred to as "first target data source") from which a table is to be acquired first by comparing the number of records of the first DB management device 21 with the number of records of the second DB management device 22 (step S4).

In step S4, the DB management device having a small number of records is determined as the first target data source. Specifically, in a case where the number of records of the first DB management device 21 is less than the number of records of the second DB management device 22, the first DB management device 21 is determined as the first target data source. On the other hand, in a case where the number of records of the second DB management device 22 is less than the number of records of the first DB management device 21, the second DB management device 22 is determined as the first target data source. Note that, for example, in a case where the number of records of the first DB management device 21 is the same as the number of records of the second DB management device 22, any DB management device (one of the first and second DB management devices 21 and 22) may be determined as the first target data source.

In the following description, the DB management device that is not determined as the first target data source of the first and second DB management devices 21 and 22 is referred to as "second target data source".

Next, the query creation module 305 creates a query (hereinafter, referred to as "second query") to the first target data source (for example, the first DB management device 21) determined in step S4 based on the first query received in step S1 (step S5). The second query created in step S5 requests a table (that is, all records included in the table) of the first target data source specified in the first query.

When the process of step S5 is performed, the query execution module 306 transmits the second query to the first target data source in order to instruct the first target data source to perform the process for the second query created in step S5 (step S6).

As described above, when the second query transmitted from the information processing apparatus 30 (the query execution module 306) is received by the first target data source, the first target data source (the query execution module 213) performs the process for the second query. The table of the first target data source is acquired from the database 211 of the first target data source, and the first target data source (the communication module 212) transmits the table to the information processing apparatus 30.

In a case where the table of the first target data source is transmitted from the first target data source as described above, the query execution module 306 receives the table (step S7).

Next, the query creation module 305 creates a query (hereinafter, referred to as "third query") to the second target data source (for example, the second DB management device 22) based on the first query received in step S1 and the table of the first target data source received in step S7 (step S8). The third query created in step S8 requests a part (for example, a part of the records included in the table) of the table of the second target data source specified in the first query. Note that a specific example of the third query will be described later.

When the process of step S8 is performed, the query execution module 306 transmits the third query to the second target data source in order to instruct the second target data source to perform the process for the third query created in step S8 (step S9).

As described above, when the third query transmitted from the information processing apparatus 30 (the query execution module 306) is received by the second target data source, the second target data source (the query execution module 213) performs the process for the third query. A part of the table of the second target data source is acquired from the database 211 of the second target data source, and the second target data source (the communication module 212) transmits the part of the table to the information processing apparatus 30.

In a case where a part of the table of the second target data source is transmitted from the second target data source as described above, the query execution module 306 receives the part of the table (step S10).

Next, the query execution module 306 performs the process for the first query received in step S1 based on, for example, the table of the first target data source received in step S7 and a part of the table of the second target data source received in step S10 (step S11). Note that the process for the first query performed in step S11 includes, for example, the join operation process on the table of the first target data source received in step S7 and a part of the table of the second target data source received in step S10.

When the process of step S11 is performed, the result of the process for the first query performed in step S11 is transmitted from the information processing apparatus 30 (the communication module 303) to the client terminal 10 (the client application program) as a response to the first query (step S12).

Note that, although a detailed description will be given later, the process of step S11 described above may be omitted depending on (the request content of) the first query received in step S1. In a case where the process of step S11 is omitted in this manner, for example, a part of the table of the second target data source received in step S10 may be transmitted to the client terminal 10 as a response to the first query.

On the other hand, if it is determined that both the number of records of the first DB management device 21 and the number of records of the second DB management device 22 are not larger than or equal to the threshold (that is, less than the threshold) (NO in step S3), the information processing apparatus 30 operates similarly to the comparative example of the present embodiment described above.

Specifically, the query creation module 305 creates a query (a second query) to the first DB management device 21, for example, based on the first query received in step S1 (step S13). The second query created in step S13 requests a table (that is, all records included in the table) of the first DB management device 21 specified in the first query.

When the process of step S13 is performed, the query execution module 306 transmits the second query to the first DB management device 21 in order to instruct the first DB management device 21 to perform the process for the second query created in step S13 (step S14).

As described above, when the second query transmitted from the information processing apparatus 30 (the query execution module 306) is received by the first DB management device 21, the first DB management device 21 (the query execution module 213) performs the process for the second query. The table of the first DB management device 21 is acquired from the database 211 of the first DB management device 21, and the first DB management device 21 (the communication module 212) transmits the table to the information processing apparatus 30.

In a case where the table of the first DB management device 21 is transmitted from the first DB management device 21 as described above, the query execution module 306 receives the table (step S15).

Next, the query creation module 305 creates a query (hereinafter, referred to as "fourth query") to the second DB management device 22, for example, based on the first query received in step S1 (step S16). Unlike the third query described above, the fourth query created in step S16 requests a table (that is, all records included in the table) of the second DB management device 22 specified in the first query.

When the process of step S16 is performed, the query execution module 306 transmits the fourth query to the second DB management device 22 in order to instruct the second DB management device 22 to perform the process for the fourth query created in step S16 (step S17).

As described above, when the fourth query transmitted from the information processing apparatus 30 (the query execution module 306) is received by the second DB management device 22, the second DB management device 22 (the query execution module 213) performs the process for the fourth query. The table of the second DB management device 22 is acquired from the database 211 of the second DB management device 22, and the second DB management device 22 (the communication module 212) transmits the table to the information processing apparatus 30.

In a case where the table of the second DB management device 22 is transmitted from the second DB management device 22 as described above, the query execution module 306 receives the table (step S18).

Next, the query execution module 306 performs the process for the first query received in step S1 based on the table of the first DB management device 21 received in step S15 and the table of the second DB management device 22 received in step S18 (step S19). Note that the process for the first query performed in step S19 includes the join operation process on the table of the first DB management device 21 and the table of the second DB management device 22.

In a case where the process of step S19 is performed, the process of step S12 described above is performed.

Note that, although not illustrated in FIG. 8, for example, after the process of step S1 is performed and before the process of step S2 is performed, it may be determined whether or not the first query received in step S1 is a query (for example, a query to request a result of the join operation process on the tables of the first and second DB management devices 21 and 22) suitable for performing the process of step S2 and subsequent steps. In such a configuration, for example, in a case where it is determined that the first query is a suitable query, the process of step S2 and subsequent steps is performed, and in a case where it is determined that the first query is not a suitable query, an error may be returned from the information processing apparatus 30 to the client terminal 10.

Figure 9:
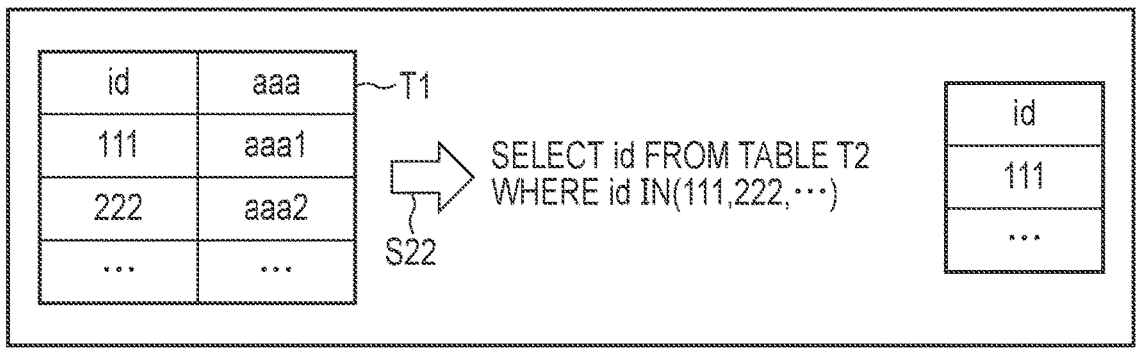
FIG. 9 is a diagram for specifically explaining an operation of the information processing apparatus.

Hereinafter, the operation of the information processing apparatus 30 according to the present embodiment will be specifically described with reference to FIG. 9.

Here, it is assumed that the table T1 similar to that in FIG. 3 is stored in the database 211 of the first DB management device 21 and the table T2 similar to that in FIG. 3 is stored in the database 211 of the second DB management device 22. In addition, it is assumed that the storage 301 of the information processing apparatus 30 stores the number-of-records information illustrated in FIG. 7.

Furthermore, it is assumed that, for example, "SELECT TABLE T2.id FROM TABLE T1 INNER JOIN TABLE T2 ON TABLE T1.id=TABLE T2.id" (a first query) is received by the communication module 303 of the information processing apparatus 30.

Further, since the number of records (that is, the number of records of the first DB management device 21) included in the table T1 of the first DB management device 21 indicated by the number-of-records information 301a illustrated in FIG. 7 is 2,000,000, and the number of records (that is, the number of records of the second DB management device 22) included in the table T2 of the second DB management device 22 indicated by the number-of-records information 301b is 10,000,000, it is assumed that (at least one of) the number of records of the first DB management device 21 and the number of records of the second DB management device 22 is larger than or equal to the threshold described above.

In this case, the query creation module 305 determines the first DB management device 21 having a small number of records as the first target data source.

Next, the query creation module 305 creates a query (a second query) to the first DB management device 21 determined as the first target data source.

The query execution module 306 transmits the second query created as described above to the first DB management device 21, and causes the first DB management device 21 to perform the process for the second query. As a result, the query execution module 306 receives the table T1 from the first DB management device 21 (step S21). The table T1 received by the query execution module 306 in this case has 2,000,000 records.

Next, the query creation module 305 creates a query (a third query) to the second DB management device 22 (that is, the second target data source) that is not determined as the first target data source based on the first query and the table T1 received from the first DB management device 21 (step S22).

Here, as described above, in a case where the first query is "SELECT TABLE T2.id FROM TABLE T1 INNER JOIN TABLE T2 ON TABLE T1.id=TABLE T2.id", the first query joins the tables T1 and T2 based on the values of the columns id set in the tables T1 and T2, and requests a list (that is, an id list) of the values of the column id set in the joined table. Therefore, the query creation module 305 creates a third query (SQL) to request acquisition of the value of the column id matching the value of the column id set in the table T1 from the table T2. The third query in this case is, for example, "SELECT id FROM TABLE T2 WHERE id IN (111, 222, . . . )". The portion "WHERE id IN (111, 222, . . . )" in the third query is a conditional clause (an IN clause) created based on the table T1 (the value of the column id) received from the first DB management device 21, and with the third query including such a conditional clause, it is possible to instruct the second DB management device 22 to acquire only the value of the column id matching the value of the column id set in the table T1 from the table T2.

The query execution module 306 transmits the third query created as described above to the second DB management device 22, thereby pushing down the third query (the SQL including the conditional clause) to the lower node (step S23). As a result, the process for the third query is performed by the second DB management device 22, and the query execution module 306 receives a part of the table T2 from the second DB management device 22 (step S24). In this case, a part of the table T2 received by the query execution module 306 includes only the values of the column id matching the values of the column id set in the table T1 among the values of the column id included in 10,000,000 records included in the table T2.

Here, in a case where the first query is "SELECT TABLE T2.id FROM TABLE T1 INNER JOIN TABLE T2 ON TABLE T1.id=TABLE T2.id", a part of the table T2 received from the second DB management device 22 in step S24 described above can be used as it is as a response to the first query. In other words, in this case, for example, it is not necessary to perform the process (that is, the join operation process) for the first query on the side of the information processing apparatus 30, and a part of the table T2 received from the second DB management device 22 is only required to be transmitted to the client terminal 10 as a response to the first query.

In the present embodiment, as described above, in a case where the result of the join operation process on the tables T1 and T2 requested by the first query includes, for example, only the values (that is, the data of the table T2) of the columns set in the table T2, a part of the table T2 received from the second DB management device 22 can be transmitted to the client terminal 10 as a response to the first query, so that the join operation process itself can be omitted.

Here, the case where the result of the join operation process includes only the values of the columns set in the table T2 has been described. However, the same applies to a case where the result of the join operation process includes only the values of the columns set in the table T1.

That is, in the present embodiment, the response to the first query based on a part of the table T2 received from the second DB management device 22 may be a part of the table T2 of the second DB management device 22, or may be a part (for example, the values of the columns set in the table T1) of the table T1 of the first DB management device 21 specified from the part of the table T2.

On the other hand, for example, in a case where the first query is "SELECT TABLE T1.aaa TABLE T2.id FROM TABLE T1 INNER JOIN TABLE T2 ON TABLE T1.id=TABLE T2.id", the result of the join operation process on the tables T1 and T2 requested by the first query includes both (that is, data of both the tables T1 and T2) of the values of the columns set in the table T1 and the values of the columns set in the table T2. In such a case, it is only required that the join operation process (that is, the process for the first query) is performed on the table T1 received from the first DB management device 21 and a part of the table T2 received from the second DB management device 22, and the result of the join operation process is transmitted to the client terminal 10 as a response to the first query.

That is, the response to the first query based on a part of the table T2 received from the second DB management device 22 may be the result of the join operation process on the table T1 received from the first DB management device 21 and a part of the table T2 received from the second DB management device 22.

Note that, although the case where the number of records of the first DB management device 21 and the number of records of the second DB management device 22 are larger than or equal to the threshold has been described here, in a case where at least one of the number of records of the first DB management device 21 and the number of records of the second DB management device 22 is less than the threshold, the information processing apparatus 30 is assumed to operate as described above with reference to FIG. 3.

As described above, in the present embodiment, by receiving the first query to request a result of the join operation process on the tables (the first and second tables) of the first and second DB management devices 21 and 22 from the client terminal 10, creating the second query to the first DB management device 21 (the first target data source) based on the received first query, and performing the process for the created second query in the first DB management device 21, the table of the first DB management device 21 is received from the first DB management device 21. Furthermore, in the present embodiment, by creating the third query to the second DB management device 22 (the second target data source) based on the first query received from the client terminal 10 and the table of the first DB management device 21 received from the first DB management device 21, and performing the process for the created third query in the second DB management device 22, a part of the table of the second DB management device 22 is received from the second DB management device 22, and a response to the first query based on the received part of the table of the second DB management device 22 is transmitted to the client terminal 10.

In the present embodiment, as described above, by creating the third query to the second DB management device 22 based on the first query received from the client terminal 10 and the table received from the first DB management device 21, only a part of the table of the second DB management device 22 is received from the second DB management device 22 (that is, it is not necessary to receive all the records included in the table). Therefore, the load (the amount of processing) of the information processing apparatus 30 can be reduced as compared with a case where all the records of the table of the second DB management device 22 are received and the process (the join operation process) for the first query is performed as in the comparative example of the present embodiment.

Note that, in a case where the number of records of the first and second DB management devices 21 and 22 is small, even if all the records of the tables are received from both the first and second DB management devices 21 and 22, the amount of processing of the process for the first query is usually small, and the process of creating the third query described above may increase the load of the information processing apparatus 30. Therefore, in the present embodiment, in a case where at least one of the number of records of the first DB management device 21 and the number of records of the second DB management device 22 indicated by the number-of-records information stored in the storage module 301 is larger than or equal to a threshold (a predetermined value), the process (hereinafter, for convenience, referred to as "first process of the present embodiment") of steps S4 to S11 illustrated in FIG. 8 is performed. On the other hand, in a case where (both of) the number of records of the first DB management device 21 and the number of records of the second DB management device 22 indicated by the number-of-records information stored in the storage 301 are less than the threshold, the process (hereinafter, for convenience, referred to as "second process of the present embodiment") of steps S13 to S19 illustrated in FIG. 8 is performed. With such a configuration, the load of the information processing apparatus 30 can be appropriately reduced in consideration of the size (that is, the number of records included in the tables) of the tables of the first and second DB management devices 21 and 22 to be subjected to the join operation process.

Further, in the present embodiment, in a case where the number of records of the first DB management device 21 indicated by the number-of-records information stored in the storage 301 is smaller than the number of records of the second DB management device 22, the table of the first DB management device 21 is received prior to the table of the second DB management device 22. With such a configuration, the number of records received from the first and second DB management devices 21 and 22 as a whole of the information processing apparatus 30 can be reduced as compared with a case where a table with a large number of records is received first, so that the load of the information processing apparatus 30 can be further reduced.

It is assumed in the present embodiment that the number-of-records information stored in the storage 301 is collected from the first and second DB management devices 21 and 22. With such a configuration, even in a case where (the number of records included in) the tables of the first and second DB management devices 21 and 22 are updated, it is possible to store suitable number-of-records information in the storage 301.

Furthermore, in the present embodiment, the third query to the second DB management device 22 is created based on the first query and the table of the first DB management device 21, but the third query includes a conditional clause created based on the table of the first DB management device 21. In the present embodiment, with such a configuration, the third query (that is, a SQL including a WHERE clause) including the conditional clause can be pushed down to the second DB management device 22 (that is, the lower node), and thus the load of the information processing apparatus 30 can be reduced.

Note that, for example, in a case where the result of the join operation process on the tables of the first and second DB management devices 21 and 22 requested by the first query includes only one of the values (that is, the data of the table of the first DB management device 21) of the columns set in the first DB management device 21 and the values (that is, the data of the table of the second DB management device 22) of the columns set in the second DB management device 22, the join operation process is not performed as described above with reference to FIG. 9, and for example, a part of the table of the second DB management device 22 received from the second DB management device 22 (the second target data source) is transmitted to the client terminal 10 as a response to the first query. With such a configuration, since the join operation process in the information processing apparatus 30 can be omitted, the load of the information processing apparatus 30 can be further reduced.

On the other hand, for example, in a case where the result of the join operation process on the tables of the first and second DB management devices 21 and 22 requested by the first query includes both the values of the columns set in the first DB management device 21 and the values of the columns set in the second DB management device 22, it is necessary to perform the join operation process on the table received from the first DB management device 21 and a part of the table received from the second DB management device 22. However, in the present embodiment, since the size (the number of records) of the table received from the second DB management device 22 can be reduced as described above, the amount of processing of the join operation process can be reduced as compared with the configuration of the comparative example of the present embodiment described above.

Note that, in the present embodiment, it has been described that the process illustrated in FIG. 8 described above is performed, but the present embodiment is only required to have a configuration in which the load of the information processing apparatus 30 is reduced by reducing the number of records received (acquired) by the information processing apparatus 30 from the first and second DB management devices 21 and 22 as compared with the comparative example of the present embodiment, and for example, the process of step S3 illustrated in FIG. 8 may be omitted. In this case, regardless of the number of records included in the tables of the first and second DB management devices 21 and 22, it can be configured that the first process (the process of steps S4 to S11) of the present embodiment is performed, and the second process (the process of steps S13 to S19) of the present embodiment is not performed.

Furthermore, the present embodiment may have a configuration in which regardless of the number of records included in the tables of the first and second DB management devices 21 and 22, any DB management device of the first and second DB management devices 21 and 22 is determined as the first target data source in step S4 illustrated in FIG. 8.

Second Embodiment

Next, a second embodiment will be described. In the present embodiment, detailed description of parts similar to those of the first embodiment described above will be omitted, and parts different from those of the first embodiment will be mainly described. Note that, since the configuration of an information processing system in the present embodiment is similar to that in the first embodiment described above, the configuration will be described with reference to FIGS. 1, 5, 6, and the like as appropriate.

Here, in the first embodiment, it has been described that the process of steps S3 and S4 illustrated in FIG. 8 described above is performed simply using the number of records of first and second DB management devices 21 and 22. However, for example, in a case where a conditional clause (a WHERE clause) is included in a first query, the number of records actually received from the first and second DB management devices 21 and 22 may decrease in accordance with the conditional clause.

Therefore, an information processing apparatus 30 according to the present embodiment is different from that of the first embodiment described above in that, in a case where the first query received from a client terminal 10 includes a conditional clause specifying a value of a column set in the table of the first DB management device 21 or the table of the second DB management device 22, the number of records received from the first and second DB management devices 21 and 22 is estimated in accordance with the conditional clause.

Note that, as described above, the functional configuration of the information processing apparatus 30 according to the present embodiment is the same as the functional configuration illustrated in FIG. 5, but storage 301 included in the information processing apparatus 30 stores number-of-record-types information indicating the types of records included in the tables of the first and second DB management devices 21 and 22, in addition to the number-of-records information described in the first embodiment. Note that the number-of-record-types information is managed by an information management module 302 similarly to the number-of-records information described above.

Figure 10:
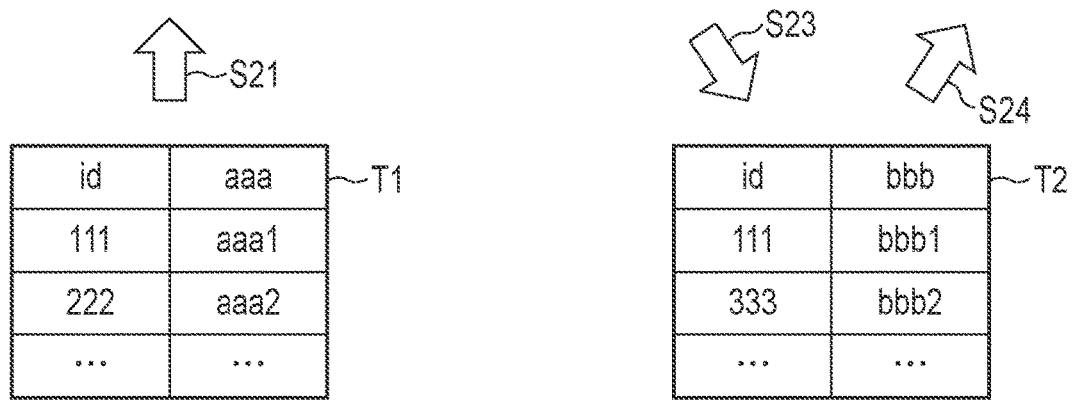
FIG. 10 is a diagram illustrating an example of a data structure of record type information in a second embodiment.

FIG. 10 illustrates an example of a data structure of number-of-record-types information stored in the storage 301 of the information processing apparatus 30.

As illustrated in FIG. 10, the number-of-record-types information includes a node ID, a table name, a column name, and cardinality.

The node ID is identification information for identifying a DB management device (that is, a node) communicably connected to the information processing apparatus 30. The table name is a name assigned to the table of the DB management device identified by the node ID associated with the table name. The column name is a name assigned to a column set in the table to which the table name associated with the column name is assigned. The cardinality is the number of different values included in the column (the same column) to which the column name associated with the cardinality is assigned.

That is, in the present embodiment, assuming that among a plurality of records included in the same table, records with the same value of a specific column set in the table are treated as records of the same type, it can be said that the cardinality included in the number-of-record-types information represents the number of types of records included in the table.

Here, as illustrated in FIG. 10, it is assumed that the storage 301 stores pieces of number-of-record-types information 301$c$ to 301$f$. Note that, it is assumed that a table T1 is stored in a database 211 of the first DB management device 21 and a table T2 is stored in a database 211 of the second DB management device 22.

The number-of-record-types information 301$c$ includes a node ID "001", a table name "T1", a column name "id", and cardinality "100". The number-of-record-types information 301$c$ indicates that the table T1 is stored in the database 211 of the first DB management device 21 (the DB management device identified by the node ID "001"), and the number of different values included in the column id set in the table T1 is 100. In other words, the number-of-record-types information 301$c$ indicates that the table T1 has 100 types of records in a case where records with the same value of the column id are regarded as records of the same type.

The number-of-record-types information 301$d$ includes the node ID "001", the table name "T1", a column name "aaa", and cardinality "1,000". The number-of-record-types information 301$d$ indicates that the table T1 is stored in the database 211 of the first DB management device 21, and the number of different values included in the column aaa set in the table T1 is 1,000. In other words, the number-of-record-types information 301$d$ indicates that the table T1 has 1,000 types of records in a case where records with the same value of the column aaa are regarded as records of the same type.

The number-of-record-types information 301$e$ includes a node ID "002", a table name "T2", the column name "id", and the cardinality "1,000". The number-of-record-types information 301$e$ indicates that the table T2 is stored in the database 211 of the second DB management device 22 (the DB management device identified by the node ID "002"), and the number of different values included in the column id set in the table T2 is 1,000. In other words, the number-of-record-types information 301$e$ indicates that the table T2 has 1,000 types of records in a case where records with the same value of the column id are regarded as records of the same type.

The number-of-record-types information 301$f$ includes the node ID "002", the table name "T2", a column name "bbb", and cardinality "10,000". The number-of-record-types information 301f indicates that the table T2 is stored in the database 211 of the second DB management device 22, and the number of different values included in the column bbb set in the table T2 is 10,000. In other words, the number-of-record-types information 301f indicates that the table T2 has 10,000 types of records in a case where records with the same value of the column bbb are regarded as records of the same type.

Here, the number-of-record-types information 301c to 301f has been described, but it is assumed that the number-of-record-types information is stored in the storage 301 for each column (that is, a column for determining a record type) set in the table stored in the database 211 of each of the first and second DB management devices 21 and 22.

Next, an example of a processing procedure of the information processing apparatus 30 according to the present embodiment will be described with reference to a flowchart of FIG. 11.

First, the process of step S31 corresponding to the process of step S1 illustrated in FIG. 8 described above is performed.

When the process of step S31 is performed, the first query received in step S31 is analyzed by a query analysis module 304. A query creation module 305 determines whether or not the first query includes a conditional clause (a WHERE clause) based on the result of analysis of the first query by the query analysis module 304 (step S32).

Note that, in a case where the first query is "SELECT TABLE T2.id FROM TABLE T1 INNER JOIN TABLE T2 ON TABLE T1.id=TABLE T2.id" described in the first embodiment, it is determined in step S32 that the first query does not include the conditional clause. On the other hand, in a case where the first query is "SELECT TABLE T2.id FROM TABLE T1 INNER JOIN TABLE T2 ON TABLE T1.id=TABLE T2.id WHERE TABLE T2.bbb='xxx'", it is determined in step S32 that the first query includes the conditional clause.

If it is determined that the first query includes the conditional clause (YES in step S32), the query creation module 305 acquires number-of-records information and number-of-record-types information from the storage 301 via the information management module 302 (step S33).

When the process in step S33 is performed, the query creation module 305 estimates, based on the number-of-records information and the number-of-record-types information acquired in step S33, the number of records (hereinafter, referred to as "the number of records received from the first DB management device 21") assumed to be received from the first DB management device 21 based on the first query and the number of records (hereinafter, referred to as "the number of records received from the second DB management device 22") assumed to be received from the second DB management device 22 based on the first query (step S34).

Note that, for example, in a case where the value of the column set in the table of the first DB management device 21 is specified in the conditional clause included in the first query, the number of records received from the first DB management device 21 estimated in step S34 is calculated based on the number of records of the first DB management device 21 and the cardinality (that is, the cardinality included in the number-of-record-types information in association with the column name assigned to the column) of the column whose value is specified in the conditional clause. On the other hand, for example, in a case where the value of the column set in the table of the first DB management device 21 is not specified in the conditional clause included in the first query, the number of records received from the first DB management device 21 is estimated to be the number of records of the first DB management device 21.

Similarly, for example, in a case where the value of the column set in the table of the second DB management device 22 is specified in the conditional clause included in the first query, the number of records received from the second DB management device 22 estimated in step S34 is calculated based on the number of records of the second DB management device 22 and the cardinality of the column whose value is specified in the conditional clause. On the other hand, for example, in a case where the value of the column set in the table of the second DB management device 22 is not specified in the conditional clause included in the first query, the number of records received from the second DB management device 22 is estimated to be the number of records of the second DB management device 22.

Here, the process of step S34 described above will be specifically described. Here, it is assumed that the table T1 similar to that in FIG. 3 is stored in the database 211 of the first DB management device 21 and the table T2 similar to that in FIG. 3 is stored in the database 211 of the second DB management device 22. In addition, it is assumed that the storage 301 of the information processing apparatus 30 stores the number-of-records information illustrated in FIG. 7 and the number-of-record-types information illustrated in FIG. 10. Furthermore, the first query received in step S31 is assumed to be "SELECT TABLE T2.id FROM TABLE T1 INNER JOIN TABLE T2 ON TABLE T1.id=TABLE T2.id WHERE TABLE T2.bbb='xxx'".

In this case, since the first query includes the conditional clause (here, "WHERE TABLE T2.bbb='xxx'"), pieces of the number-of-records information 301a and 301b illustrated in FIG. 7 and pieces of the number-of-record-types information 301c to 301f illustrated in FIG. 10 are acquired.

Next, in step S34, the number of records received from the first DB management device 21 is estimated. In this case, since the value of the column set in the table T1 is not specified in the conditional clause included in the first query, the number of records received from the first DB management device 21 is estimated to be 2,000,000 indicated by the number-of-records information 301a.

Similarly, in step S34, the number of records received from the second DB management device 22 is estimated. In this case, since the value of the column bbb set in the table T2 is specified in the conditional clause included in the first query, the number of records received from the second DB management device 22 is calculated based on the number-of-records information 301b and the number-of-record-types information 301f including the cardinality of the column bbb.

Meanwhile, the number of records of the second DB management device 22 indicated by the number-of-records information 301b is 10,000,000, and the cardinality (hereinafter, referred to as "target cardinality") of the column bbb set in the table T2 of the second DB management device 22 is 10,000.

As a result, in the case of receiving (the records included in) the table T2 of the second DB management device 22 from the second DB management device 22 in accordance with the conditional clause included in the first query, only the record in which the value of the column bbb is "xxx" among 10,000,000 records included in the table T2 is received.

In this case, the number of records in which the value of the column bbb is "xxx" among 10,000,000 records included in the table T2 is unknown, but assuming that the numbers of records of the individual types in the table T2 are approximately the same, the number of records (that is, the number of records in which the value of the column bbb is "xxx") received from the second DB management device 22 can be estimated to be, for example, 10,000,000/10,000=1,000.

When the process of step S34 is performed, the process of steps S35 to S51 corresponding to the process of steps S3 to S19 illustrated in FIG. 8 described above is performed using the number of records received from each of the first and second DB management devices 21 and 22, which is estimated in step S34, instead of the number of records of each of the first and second DB management devices 21 and 22 described in the first embodiment.

Note that, as described above, for example, in a case where 2,000,000 is estimated as the number of records received from the first DB management device 21 and 1,000 is estimated as the number of records received from the second DB management device 22, if it is determined in step S35 that at least one of the numbers of records received is larger than or equal to a threshold, the second DB management device 22 with a small number of records received is determined as the first target data source in step S36. In this case, in step S39, the record in which the value of the column bbb is "xxx" is received from the second DB management device 22. In addition, in step S42, a list (id list) of values of the column id matching the values of the column of id included in the records received from the second DB management device 22 among the values of the column id set in the table of the first DB management device 21 is received from the first DB management device 21. In this case, in step S44, since it is not necessary to perform the process for the first query as described in the first embodiment, the id list received from the first DB management device 21 is transmitted to the client terminal 10 as a response to the first query.

On the other hand, if it is determined that the first query does not include the conditional clause (NO in step S32), the process of step S52 corresponding to the process of step S2 illustrated in FIG. 8 described above is performed.

When the process of step S52 is performed, the process of steps S35 to S51 corresponding to the process of steps S3 to S19 illustrated in FIG. 8 described above is performed.

As described above, in the present embodiment, in a case where the first query received from the client terminal 10 includes a conditional clause specifying the values of the columns set in the tables of the first and second DB management devices 21 and 22, the process is performed using the number of records received from the first and second DB management devices 21 and 22 estimated based on the conditional clause included in the first query, the number-of-records information, and the number-of-record-types information, instead of the number of records indicated by the number-of-records information.

In the present embodiment, with such a configuration, for example, it is possible to avoid the case where the first process (that is, the process of step S36 and subsequent steps illustrated in FIG. 11) of the first embodiment described above is performed even though, for example, the number of records actually received from the first and second DB management devices 21 and 22 based on (the conditional clause included in) the first query is small (that is, the load increases as compared with that of the second process of the first embodiment).

Furthermore, in the present embodiment, it is possible to avoid the case where the load of the information processing apparatus 30 cannot be appropriately reduced by simply receiving the table (the record) first from the first DB management apparatus 21 in which the number of records indicated by the number-of-records information is small (that is, by determining the first DB management device 21 as the first target data source) even though the number of records received from the second DB management device 22 is smaller than the number of records received from the first DB management device 21.

According to at least one embodiment described above, it is possible to provide an information processing apparatus, a method, and a program capable of reducing a load.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus communicably connected to a client terminal used by a user, a first database management device that manages a first database that stores a first table, and a second database management device that manages a second database that stores a second table, the information processing apparatus comprising:
   a processor configured to:
      receive, from the client terminal, a first query to request a result of a join operation process on the first and second tables;
      create a second query to the first database management device based on the first query received;
      receive a first table stored in the first database from the first database management device by performing, in the first database management device, a process on the second query created;
      create a third query to the second database management device based on the first query received and the first table received;
      receive a part of a second table stored in the second database from the second database management device by performing, in the second database management device, a process on the third query created; and
      transmit, to the client terminal, a response to the first query based on the part of the second table received; and
   a memory configured to store number-of records information indicating a number of first records included in the first table and a number of second records included in the second table, wherein
   processes of creating a third query, receiving a part of a second table, and transmitting a response to the first query based on the part of the second table are performed in a case where at least one of the number of the first records and the number of the second records indicated by the number-of-records information stored in the memory is larger than or equal to a predetermined value, and
   the processor is configured to:
      create a fourth query to the second database management device based on the first query received in a case where a number of first records and a number of second records indicated by number-of-records information stored in the memory are less than the predetermined value;

receive a second table stored in the second database from the second database management device by performing, in the second database management device, a process on the fourth query created; and transmit, to the client terminal, a result of a join operation process on the first table received and the second table received as a response to the first query.

2. An information processing apparatus communicably connected to a client terminal used by a user, a first database management device that manages a first database that stores a first table, and a second database management device that manages a second database that stores a second table, the information processing apparatus comprising:

a processor configured to:

receive, from the client terminal, a first query to request a result of a join operation process on the first and second tables;

create a second query to the first database management device based on the first query received;

receive a first table stored in the first database from the first database management device by performing, in the first database management device, a process on the second query created;

create a third query to the second database management device based on the first query received and the first table received;

receive a part of a second table stored in the second database from the second database management device by performing, in the second database management device, a process on the third query created; and transmit, to the client terminal, a response to the first query based on the part of the second table received; and a memory configured to store number-of records information indicating a number of first records included in the first table and a number of second records included in the second table, wherein processes of creating a third query, receiving a part of a second table, and transmitting a response to the first query based on the part of the second table are performed in a case where at least one of the number of the first records and the number of the second records indicated by the number-of-records information stored in the memory is larger than or equal to a predetermined value, the memory is further configured to store number-of-record-types information indicating a number of types of the first record and a number of types of the second record, and in a case where the first query includes a conditional clause specifying a value of a column set in the first or second table, instead of a number of first records and a number of second records indicated by number-of-records information stored in the memory, the number of the first records and the number of the second records estimated based on the number-of-records information and the number-of-record types information stored in the memory are used.

* * * * *